Sept. 22, 1970      R. GRUSKA      3,529,899

HOLDER FOR LIQUID MAKE-UP

Filed June 24, 1969      8 Sheets-Sheet 1

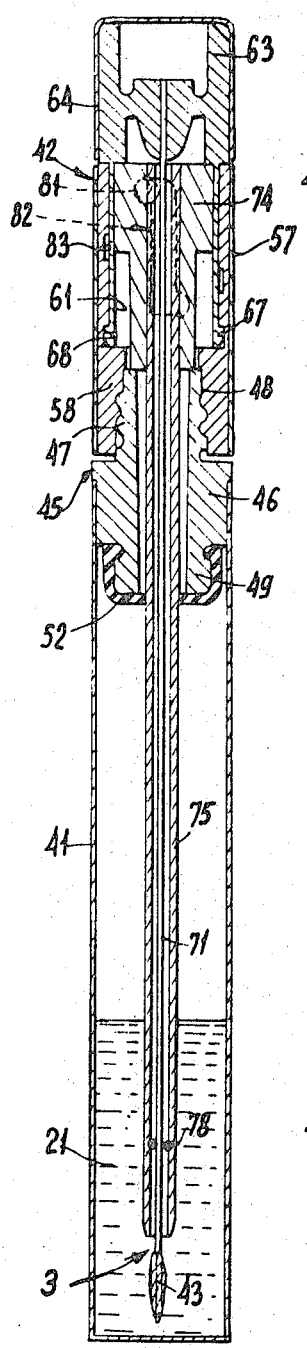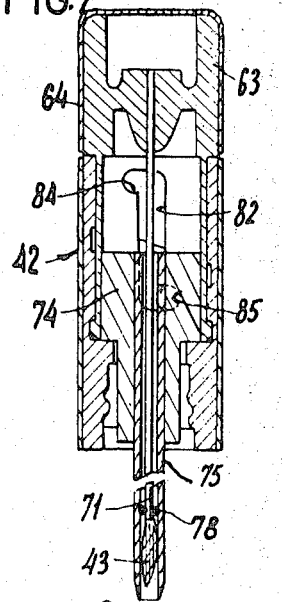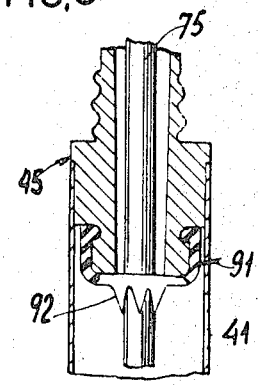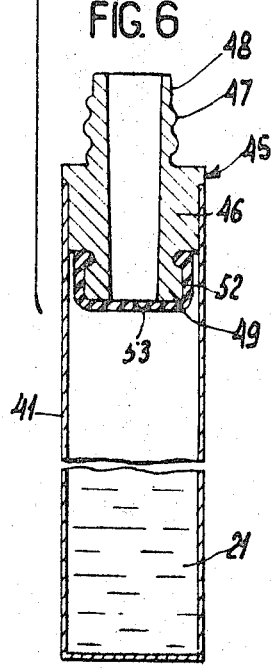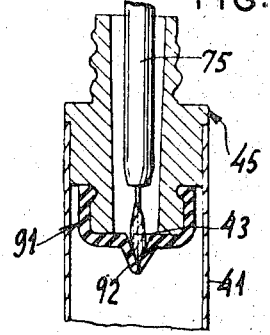

Sept. 22, 1970              R. GRUSKA              3,529,899

HOLDER FOR LIQUID MAKE-UP

Filed June 24, 1969                                          8 Sheets-Sheet 3

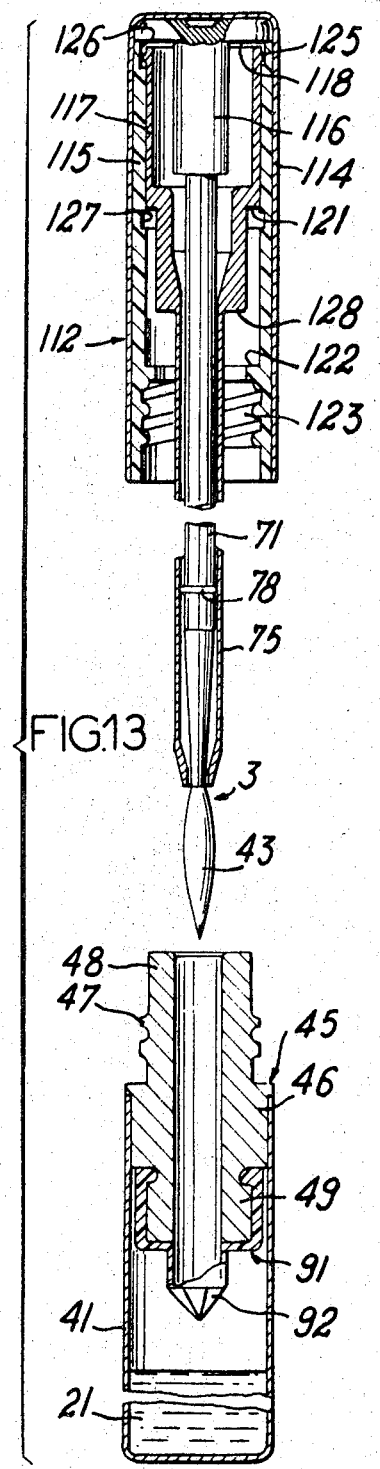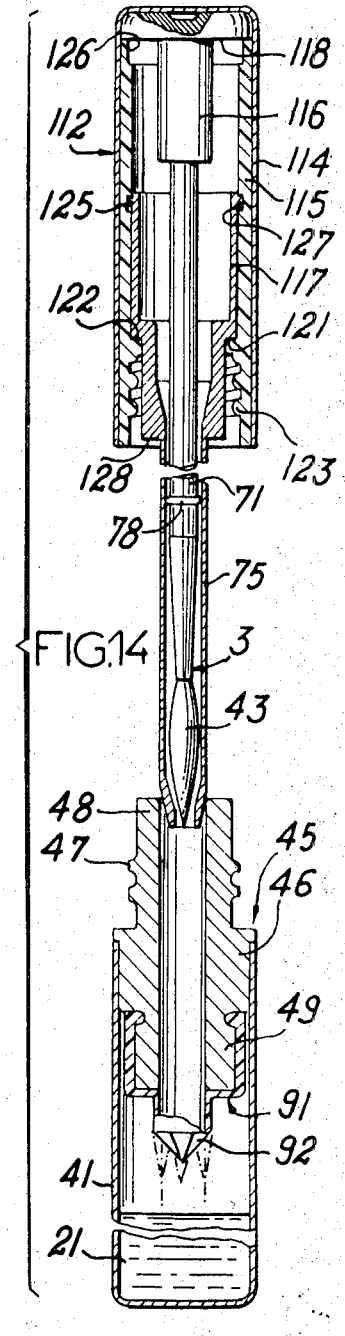

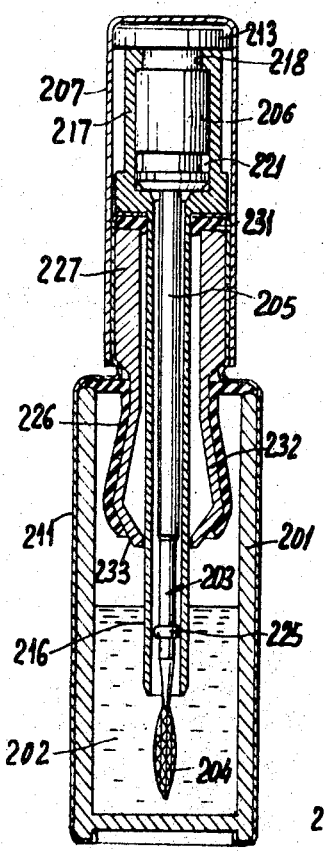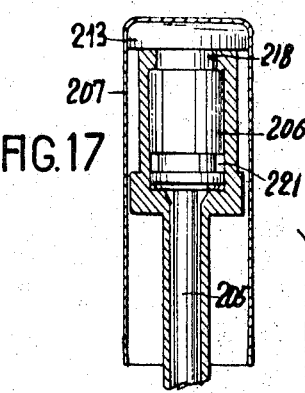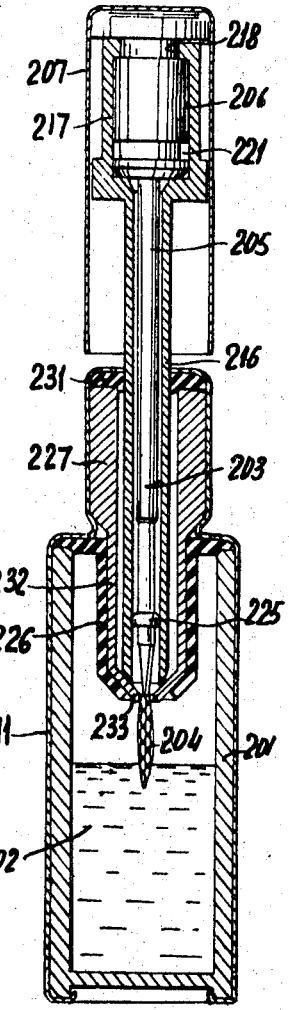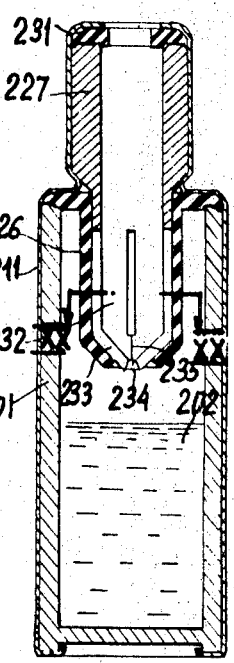

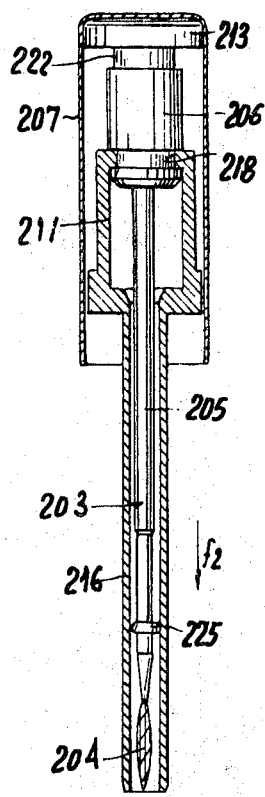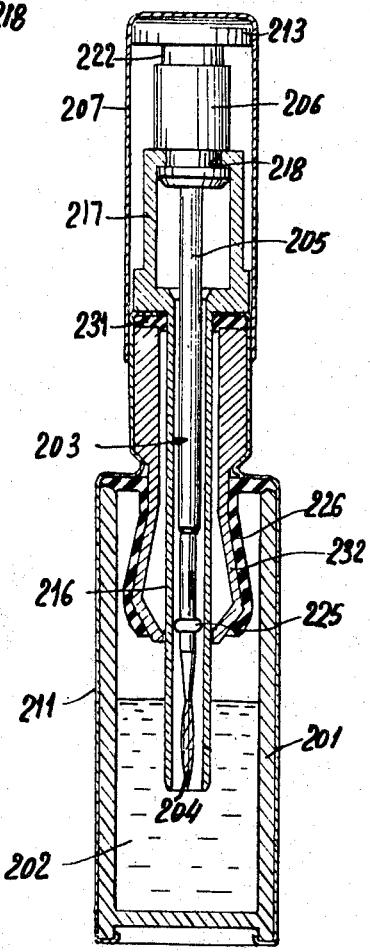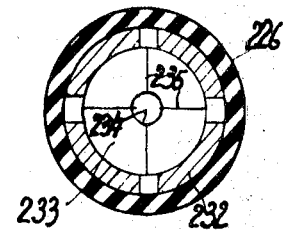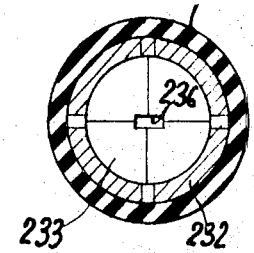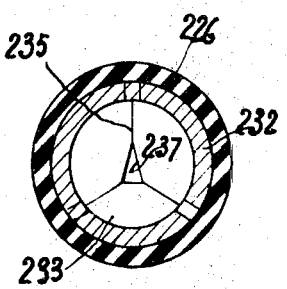

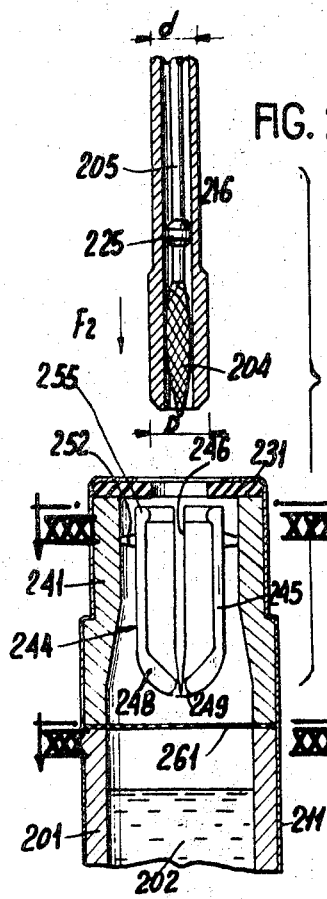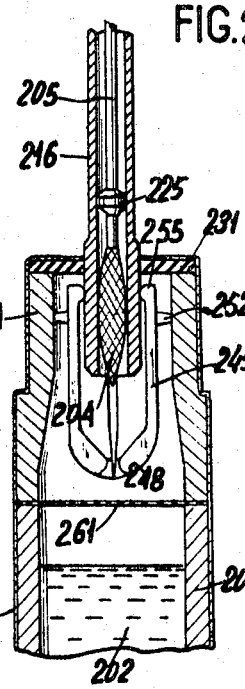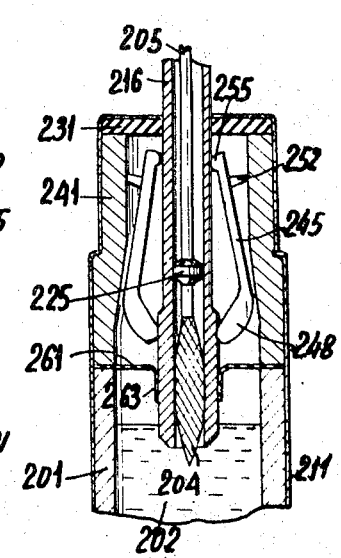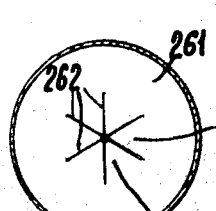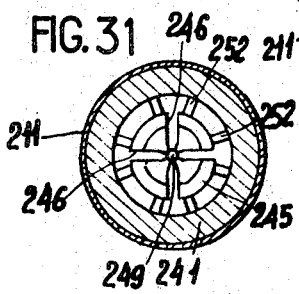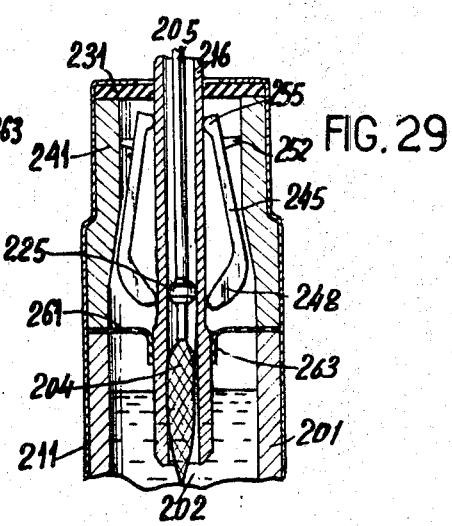

United States Patent Office 3,529,899
Patented Sept. 22, 1970

3,529,899
HOLDER FOR LIQUID MAKE-UP
Ralph Gruska, Saint Maur, Val-de-Marne, France, assignor to Ejectoret S.A., Geneva, Switzerland
Continuation-in-part of application Ser. No. 717,815, Apr. 1, 1968. This application June 24, 1969, Ser. No. 835,947
Claims priority, application France, Apr. 5, 1967, 101,521; Aug. 22, 1967, 118,512; Mar. 15, 1968, 143,891; June 25, 1968, 156,389
Int. Cl. A46b 11/00
U.S. Cl. 401—121                            27 Claims

ABSTRACT OF THE DISCLOSURE

A container for cosmetic paints or similar liquids has a closure carrying a brush. A protective tube covers the brush and is slidable so as to reveal the hairs of the brush for use or to cover them to enable the brush to be pushed back into the container through a resilient sealing and cleaning gland in the neck of the container without the hairs being ruffled.

---

This invention is a continuation in part of my prior application Ser. No. 717,815 filed Apr. 1, 1968, now abandoned and is concerned with devices for applying make-up, cosmetics, medicaments, paints or similar products which are more or less viscous liquids (uniformly referred to herein by the word "paint" for simplicity) comprising a brush mounted on the closure of a container, such as a little flask containing the said paint. Thus, when the closure is in place on the container, the brush is immersed in the paint and, in use, it is sufficient to remove the closure to have at one's disposal the brush charged with paint. However, the stem of the brush becomes dirty especially as the brush, particularly when it is used with liquid paints for the eyes, is often directed upwards and the liquid has, in consequence, a tendency to run from the end of the brush, along the stem, towards the closure.

To overcome this inconvenience, one could simply fit the neck of the flask with a resilient annular sealing gland opened to a diameter less than that of the stem of the brush, but then one would encounter serious difficulties in threading the brush, without causing it to deteriorate, into the hole in the gland, when replacing the closure on the container, which would not be practicable.

The invention has as its principal object to overcome the problem of the cleanliness of the stem of the brush without deterioration of the brush itself.

To this end, according to the invention, the stem of the brush is enclosed in a protective tube which, under the action of appropriate control means, slides relatively to said stem in a manner such as to cover the hairs of the brush at least when one replaces the latter in the container, and to uncover them, at least when one tightens the brush, the neck of the container comprising a resilient gland gripping the tube in place.

When one withdraws the brush-carrying closure and removes the brush from the container, the resilient gland scrapes the liquid from the tube which protects the stem and causses it to fall back into the reservoir.

On the other hand, when one replaces the brush in the container, the associated end part of the tube completely covers again the hairs of the brush and prevents their being ruffled, particularly against the edge of the resilient gland.

Another object is to provide an improved device as set forth in the preceding paragraphs with means such that when one withdraws the brush loaded with paint from the container it has a configuration well adapted to the particular use to which it is to be put, for example, a finely tapered circular shape, a flat shape, a triangular shape, etc.

To this end according to the invention, the neck of the container is provided internally with a deformable tubular element forming a shaping gripper which comprises several segments separated one from another by radial slits and terminating in shaping lips bearing resiliently one against another, the ends of said lips together forming a partition generally of substantially conical shape of which the summit, facing towards the bottom of the container, is pierced to the shape which one wishes to give the brush when one withdraws it from the container.

Such devices, thus improved, give general satisfaction, but it can happen however that if the device remains unused for a very long time the shaping lips no longer resiliently bear one against another, when one withdraws the brush again, with a force sufficient for it to be shaped in a manner altogether satisfactory.

To remedy this difficulty according to another characteristic feature of the invention, the deformable tubular element forming the shaping gripper is disposed coaxially inside the neck of the container to which its segments, completely separate one from another, are attached, in an intermediate zone of their length, by flexible hinge elements, the end of each segment opposite to that which presents the shaping lip being provided with an internal rib of which the diameter is such that when only the end of the protective sheath of the brush engages said rib the shaping lips are pressed against one another.

Thanks to this particular arrangement the shaping lips are no longer urged one against another by the simple effect of the resilience of the material from which they are made, but they are actually urged mechanically one against another by pivotal movement about their hinges under the action of the protective sheath which exerts, on the ribs of the segments opposite to the lips, a separating force which results in a gripping action of said lips.

The accompanying drawings show, by way of example, some embodiments of a holder for liquid paints in accordance with the invention. In these drawings:

FIG. 4 shows, to a larger scale, a detail of the upper part of FIG. 3;

FIG. 5 shows, in longitudinal section, a second embodiment;

FIG. 6 shows the same holder open, in its position of use;

FIG. 7 shows the brush-carrying closure nearly replaced in the container;

FIGS. 8 and 9 show, in section, a variation of the sealing gland shown in FIG. 5;

FIG. 13 and 14 show in longitudinal section a fourth embodiment, respectively in the course of removal and replacement of the brush;

FIG. 15 is a longitudinal section of a first embodiment of a device according to the invention, shown closed;

FIG. 16 is a view similar to FIG. 15 and showing a stage during the opening of the device;

FIG. 17 shows the device completely open and ready for use;

FIG. 18 shows a preliminary stage during closure of the device;

FIG. 19 shows the last stage of closing the device;

FIG. 20 is, to a larger scale, a partial transverse section along the line XX—XX of FIG. 17;

FIGS. 21 and 22 show two variations of FIG. 20;

FIGS. 24 to 29 are partial views which illustrate the successive stages of withdrawal of the brush and its replacement in the container; and FIGS. 30 and 31 are partial transverse sections, taken, respectively along the lines XXX—XXX and XXXI—XXXI of FIG. 26.

Figure 1:
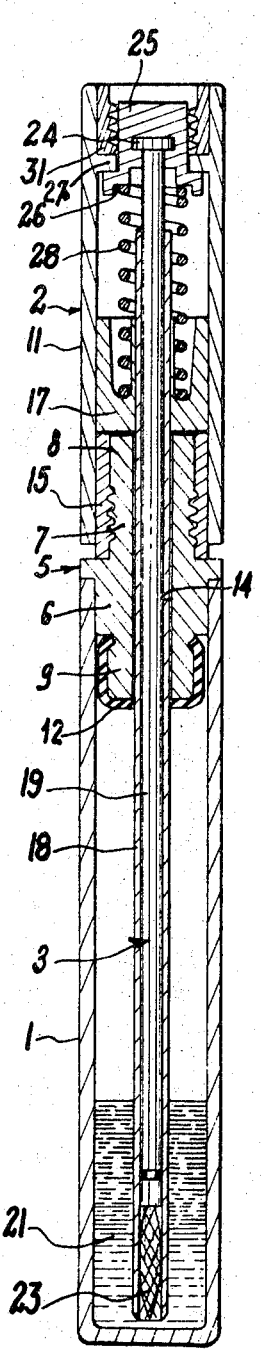
FIG. 1 is a longitudinal section through a first embodiment of a holder for liquid paint in accordance with the invention shown closed.

The holder for paints or other liquid products shown in FIGS. 1 to 4, comprises essentially a container 1 and a closure 2 on which is mounted a brush 3.

The holder 1 and closure 2 are, for aesthetic reasons, both cylindrical bodies of the same diameter for example a metal or a plastic material.

The end of the container 1, opposite to its base, is fitted with a tubular component 5 forming a neck.

The component 5 comprises an intermediate cylindrical part 6 fitted by force into the associated end of the container 1, a threaded part 7 and a cylindrical part 8 of diameter a little less than that of the threaded part 7, together with an inner end part 9 which is gripped by a cap 12, of an elastomeric material, formed with a central hole 13 of diameter a little less than the bore of the neck 5.

The threaded part 7 of the neck 5 screws into an internally threaded tubular component 15 fitted by force into the end of the closure 2.

The body of the closure is constituted by a tubular component 11 and its base by a component 17, also fitted by force into the tubular component 11 and against which bears the end of the cylindrical part 8 of the neck of the container when the closure is screwed onto the said container (FIG. 1).

Figure 2:
FIG. 2 shows in elevation the same holder as it is just being opened.

The base 17 of the closure is pierced with an axial hole in which is fitted by force a protective tube 18 in which the stem of the brush 3 can slide. The external diameter of the tube 18 is a little less than the diameter of the bore 14 of the neck of the container and the hole 13 in the cap 12 is a little less than the external diameter of the tube 18 so as to grip the latter and wipe away the liquid which is found on the surface, when one removes the brush from the container holding the liquid paint 21 (FIG. 2). Further the diameter of the hole 13 when the gland 12 is unstressed is such that the viscous liquid 21 in the container cannot run out, when the brush has been withdrawn, if one tips the container.

The end of the stem 19 of the brush opposite to the hairs 23 of the latter has a head 24 on which has been moulded a button 25, for example of a plastics material. The button 25 presents a little collar 26 which can bear against an annular shoulder 27 on the closure 2, under the influence of a helical compression spring 28 of which one end bears on the said button and the other end on the bottom of an annular hole formed in the associated face of the inner part 17 of the closure. In the normal position of rest, which is that shown for example in FIGS. 1 and 2, the hairs of the brush are completely withdrawn in the interior of the associated end part of the protective tube 18.

Figure 3:
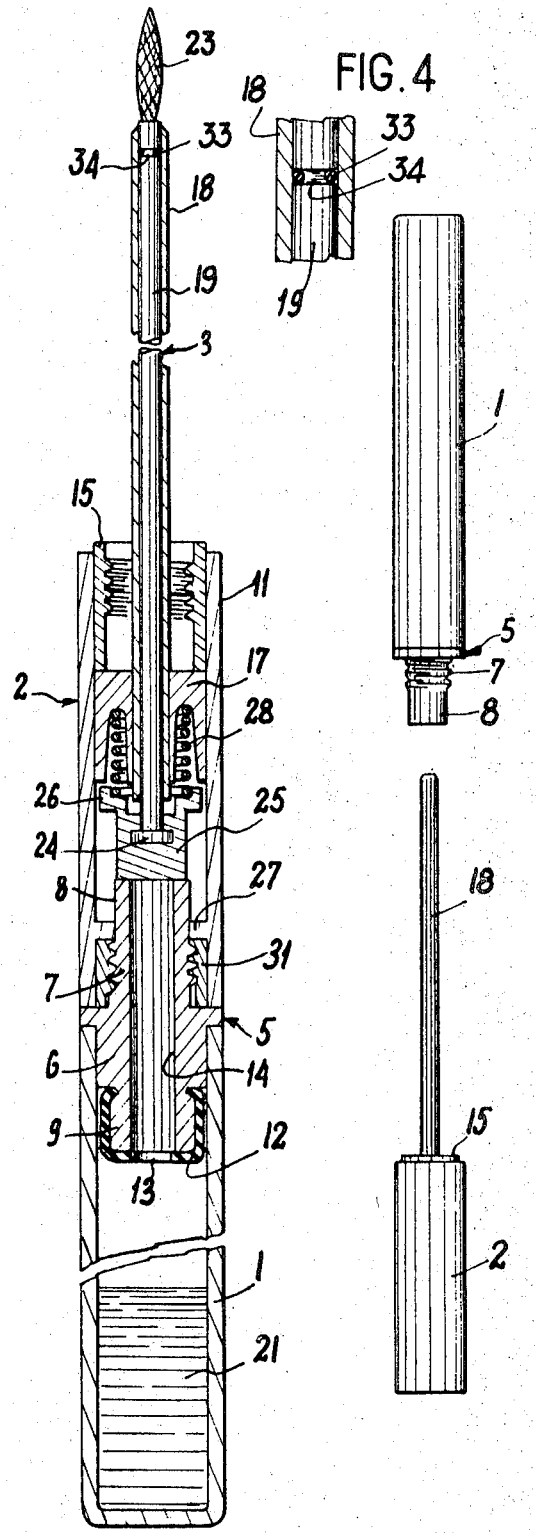
FIG. 3 is a view similar to that of FIG. 1, of the holder with the brush in its position of use.

In the end of the closure 2 opposite to that which screws onto the container, in the closed position, is fitted by force a second internally threaded component 31 similar to the component 15 and which one can consequently, also screw onto the threaded part 7 of the neck of the container, as shown in FIG. 3. The relative lengths of the different components are such that in this position of FIG. 3, the end of the part 8 of the neck of the container pushes the button 25, against the spring 28, to an extent sufficient for the hairs of the brush to project appropriately from the protective tube 8.

Finally, a sealing gland is interposed between the stem 19 and the protective tube 18. This gland 33, of toroidal shape, is lodged in an annular groove 34 (see particularly FIG. 4) hollowed in the stem 19 in the neighbourhood of that end of the latter which carries the hairs 23, but at a sufficient distance from this end for said gland not to leave the protective tube 18 during the sliding of the latter relatively to the stem 19 of the brush.

The operation of the device is as follows:

When the holder is closed, as shown in FIG. 1, the hairs 23 of the brush covered by the end of the protective tube 18 are however in contact with the liquid paint 21 contained in the container 1. Further, the cap 12, which grips the protective tube 18, prevents the liquid 21 from entering the bore 14 of the neck of the container. The end of the part 8 of said neck is, on the other hand, pressed against the inner component 17 of the closure, so that the device is sealed in relation to the exterior. Further, the toroidal gland 33 prevents liquid rising between the stem 19 of the brush and the protective tube 18, so that the liquid can not pass along this gap and leave by the upper end of the closure 2. Liquid infiltrating between the brush and the protective tube would hamper the relative axial sliding movement of these two components and produce a loss of liquid to the exterior of the closure. Further, the seal thus achieved avoids an undue impregnation of the brush by the liquid.

To use the device, one unscrews the closure 2, as shown in FIG. 2. During this movement the elastomeric cap 12 (FIG. 1) wipes the protective tube 18 and returns to the interior of the container 1 the liquid which had been present on this tube. Further, the hole 13 in this cap closes itself a little due to its elasticity so that there is no risk of the liquid paint, which is viscous, momentarily escaping to the exterior. One screws the closure by means of its component 31 on to the threaded part 7 of the neck 5 of the container as shown in FIG. 3. This operation causes the brush 23 charged with liquid to project. When one has finished using the brush, one unscrews the container from the closure, which causes the brush to re-enter the interior of the protective tube 18 under the influence of the return spring 28. The closure and the brush are then disposed as shown in FIG. 2 so that when one replaces the closure in place on the container by threading the brush into the interior of the neck, the hairs of the brush are suitably protected by the end of the tube 18 at the moment of their passage through the tight orifice 13 in the sealing cap 12. One can thus screw home the closure of the container as shown in FIG. 1 without any soiling of the closure or deterioration in the shape of the brush.

Another embodiment shown in FIGS. 5 to 7 essentially comprises a container 41 and a closure 42 on which is mounted a brush 3.

The end of the container 41, opposite to its base, is provided with a tubular component 45 forming a neck. This component 45 comprises a cylindrical intermediate part 46 fitted by force in the associated end of the container, a threaded part 47 and a cylindrical part 48 of diameter a little less than that of the threaded part, together with an inner end part 49 which is gripped by a cap 52 of an elastomeric material which in its central part has a slit indicated at 53 in FIG. 6.

The closure, which is designated as a whole by the reference 42, is constituted by a tubular component 57, for example of metal, in which is fitted by force a component 58 of a plastics material. The tubular component 57 preferably has the same external diameter as that of the container 41. One end of the component 58 of the closure can be screwed onto the threaded part 47 of the neck of the container, while in its other end is rotatably mounted a tubular casing 61 which presents, above the closure 42, an extension 63 accessible from the outside in such a manner that one can turn the casing 61 in the closure 42. In the example the extension 63 of the tubular casing is covered with a metal cover 64 of the same diameter as that of the tubular component 57 of said closure.

The cylindrical casing 61 is retained axially in the component 58 by an annular flange 67 on said casing and lodged in a complementary annular groove 68 in the component 58.

The end of the stem 71 of the brush 3 is fixed to the central part of the extension 63.

Inside the tubular casing 61 can slide and turn a plug 74 in which is fixed one end of a protective tube 75 which surrounds the stem 71 of the brush and of which the other end can cover the hairs 43 of the latter, as shown in FIG. 7 in an associated longitudinal relative position of this tube and the brush. An annular sealing gland 78 is interposed between the stem of the brush and the tube 75, in the neighbourhood of the end of this latter.

The outer surfaces of the plug 74 is provided with two diametrically opposed radial lugs, such as 81, which extend through two longitudinal slots 82 in the cylindrical casing 61 and engage two helicoidal grooves 83 formed in the inner cylindrical surface of the component 58. When one turns the extension 63, that is to say the cylindrical casing 61, relatively to the closure 42, one thus displaces the plug 74 axially in said closure, so that one can make the protective tube 75 pass from the position shown in FIGS. 5 and 6, to the position shown in FIG. 7 and vice versa.

The ends of each slot 82 are terminated by two flat portions such as 84, 85 (FIG. 7) operative to lock the plug 74 longitudinally in the closure 42.

The operation of the holder is as follows:

When the holder is closed, as shown in FIG. 5, the hairs 43 of the brush are outside the protective tube 75 and are immersed in the liquid 21. To use the brush one simply unscrews the closure 42, as shown in FIG. 6. After use one begins by turning the extension 63, relatively to the closure 42, in the appropriate sense for the protective tube 73 to cover the hairs of the brush 43 (FIG. 7). One can then without risk of ruffling the brush, replace it in the container, since it is protected by the end of the tube 75 which has no difficulty in separating the lips of the slit 53 of the gland 52 to make its way when one replaces the closure on the container. One screws the closure 42 onto the neck 45. The brush is situated in the protective tube, but in any case it is wetted quite sufficiently on being dipped into the liquid 21. If one wishes one can turn the extension 63 in the other sense to raise the tube, or well only proceed with this manoeuvre at the moment of use after having unscrewed the closure for the following operation.

When one unscrews the closure 42, and as one withdraws the brush from the container the gland 52 wipes off the liquid on the protective tube 75 and thus all surplus liquid on the brush of the latter is uncovered at the moment when one withdraws it from the container.

In FIGS. 8 and 9 is shown a modification of the structure of the sealing glond of the container, in the form of a cap 91 of which the bottom, instead of having a diametral slit, comprises a central part 92 in the shape of a cone of which the point is directed towards the bottom of the container and of which the side surface has incisions 93 which extend over the whole length of said conical surface so as to form resilient triangular tongues which tend to press one against another to wipe the brush during the withdrawal of this latter, as one can understand particularly from FIG. 9.

Figure 10:
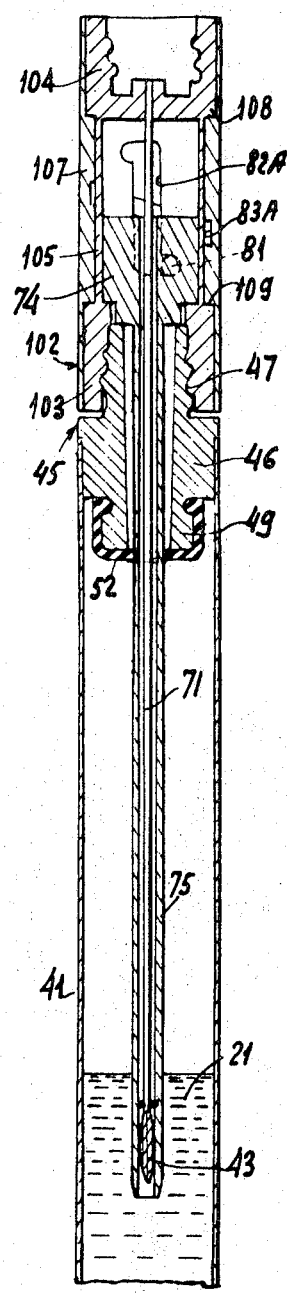
FIG. 10 shows, in longitudinal section, a third embodiment of a holder for liquid paint in accordance with the invention, in its closed position.
Figure 11:
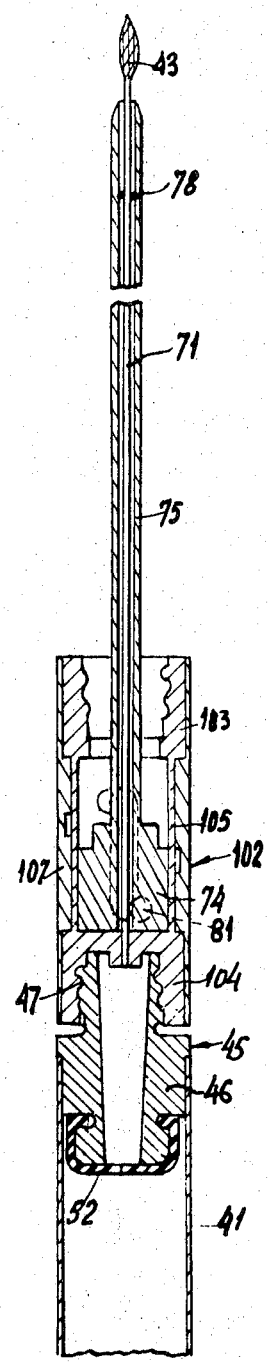
FIGS. 11 and 12 show the same holder in its position of use and in the course of being put away.
Figure 12:
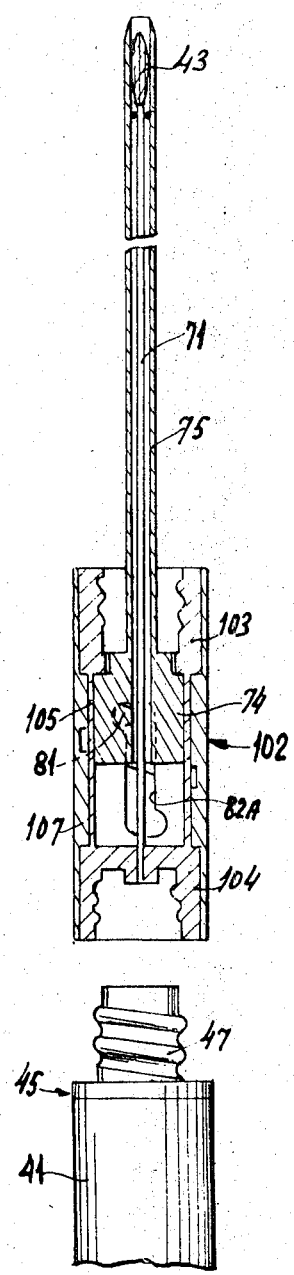

In FIGS. 10 to 12 is represented another embodiment which differs from the embodiment of FIGS. 5 to 7 in the construction of the closure. In fact this closure 102 comprises, at its two ends, two identical parts 103 and 104, respectively, which can be screwed onto the threaded part 47 of the neck of the container. The plug 74 is rotatably mounted in a central cylindrical chamber in the closure 102; its lugs extend through two longitudinal slots such as 82A formed in the central part 105 of the closure and engage in two associated helical grooves 83A formed in a cylindrical casing 107 which can rotate on the closure 102 without axial displacement relative to it. In the example the intermediate part of the cylindrical casing is thicker than its ends and is retained axially against two shoulders 108, 109, on the closure 102.

The protective tube 75 is still integral with the plug 74, but the stem 71 of the brush is, this time, fixed in the closure 102.

In this embodiment one can still slide the protective tube 75 to mask or unmask the hairs 43 of the brush, by a relative rotary movement of the cylindrical casing 107 on the closure 102, in one sense or in the other.

The hand of the screw 47 on the neck of the container and the sense of the inclination of the helical grooves 83A in the rotatable cylindrical casing 107 are such that the device can act in the following manner:

When the container is closed, as shown in FIG. 10, the protective tube 75 covers the hairs 43 of the brush. To use the device one turns the rotatable cylindrical casing 107 to the left. During the first part of this movement the plug 74 slides in the closure 102 in a direction which moves it away from the bottom of the container and consequently raises the protective tube which releases the end of the brush. In continuing to turn the cylindrical casing 107 to the left, it being understood that the plug 74 is now in abutment with the closure 102, it is this latter which is unscrewed from the neck of the container. One separates the closure from the container, then one screws it, by means of its other end 104, onto the neck of the container so as to be able to hold the brush conveniently (FIG. 11). This screwing movement leaves the plug 74 in the position where it was, so that the hairs 43 of the brush remain in the open air. After use, to put away the brush, one must remove the closure from the container and, for this, one turns the cylindrical casing 107 in the unscrewing sense, which causes the sliding of the plug 74 and the tube 75 which now recovers the hairs of the brush; in continuing this rotational movement of the cylindrical casing one frees the closure and removes it from the container (FIG. 12). One then threads the brush, protected by the tube, into the neck of the container and the tube takes its place in crossing through the gland 52 without which the brush would risk being ruffled. One rescrews the closure onto the neck with its end 103 and the resistance to screwing does not cause displacement of the plug 74 in abutment with the interior of the closure 102. One thus returns to the position shown in FIG. 10.

The holder for make-up or other liquid products shown in FIGS. 13 and 14 essentially comprises a container 41 and a closure 112 which carries a brush 3. The container 41 is similar to that of FIG. 9 and comprises a tubular component 45, with a cylindrical intermediate part 46, a threaded part 47, a cylindrical outer part 48, and an inner end part 49 on which is mounted a sealing gland 91. The closure 112 is constituted, in the example, by a stamped metal component 114 in which is fixed by force a sleeve 115, for example of a plastics material, which holds, in the end of the closure, a shouldered casing 116, also for example of a plastics material, in which is fixed the end of the stem 71 of the brush 3.

One end of the protective tube 75 for the hairs of the brush is integral with a sleeve 117 also of a plastics material in this example, which can slide in the casing 115. The axial movement of this sleeve is limited, towards the bottom of the closure 112, by its coming into contact with the shoulder 118 of the casing 116 and, in the other direction, by an annular shoulder 121 of said sleeve coming into contact with an inner annular shoulder 122 of the casing 115.

The sleeve 117 is resiliently locked in each of its two end positions of its travel in the closure, by an annular rib 125 which projects from said sleeve and which engages in one or the other of two grooves 126, 127 respectively of the casing 115.

Finally, the casing 115 has a threaded interior 123 adapted to screw onto the complementary threaded part 47 of the container.

The operation of the device is as follows: at rest, when the closure 112 is screwed onto the container 41, the protective tube 75 is disposed towards the bottom of the closure, as shown in FIG. 13, so that the hairs 43 of the brush 3 are uncovered and are directly submerged in the liquid paint 21 which it is appropriately impregnated.

For use one unscrews the closure and withdraws the brush from the container as shown in FIG. 13. After application of the paint one slides the protective tube 75 to bring it into the position in which it covers the hairs 43 of the brush as shown in FIG. 14. One can then thread the brush covered by the tube through the neck 48 of the container, without any risk of ruffling the closure reaches the neck 48 of the container, this latter pushes the sleeve 117 back from the shoulder 128 to the bottom of the closure while one screws the closure onto the container. The hairs of the brush are thus automatically uncovered and are immersed in the liquid paint 21.

Thanks to the resilient locking arrangement afforded by the annular rib 125 of the sleeve 117, there is no risk of the protective tube 75 rising in the closure while one threads it into the container to replace it, so that there is no risk of uncovering the hairs of the brush before they have reached the bottom of the container. Further, there is also no risk in use of it unexpectedly falling back over the hairs of the brush and in consequence, of obstructing the application of the paint.

The device might not be fitted with means ensuring the automatic withdrawal of the protective tube during the end of the return of the closure to its place on the container. In this case, in use, after having unscrewed the closure and withdraw the brush from the container, it is suitable then to slide the tube to uncover the hairs of the brush.

The device shown in FIGS. 15 to 22 is intended for the application of a fluid paste for eyelid make-up for example, but it could be used for the application of numerous other liquids, such as those indicated above.

The device comprises essentially a container 201 containing the liquid to be applied 202, and a brush 203 of which the hairs are indicated at 204 while its handle 205 is mounted in a brush-holder 206 mounted in a cap or closure 207 by means of which the user holds the brush.

The container 201 is, for example, of blow-moulded polyethylene and covered with a casing 211 of decorated metal for example such as aluminum or brass. The hairs 204 of the brush are, for example, hairs of the marten and the handle 205, moulded in a single piece with the brush-holder 206 is, for example, of polypropylene.

The end of the brush-holder 206 opposite the handle 205 of the brush has a base 213 mounted by force in the bottom of the cap 207. This latter is, for example, also of decorated metal, such as aluminum or brass.

The brush 203 is covered by a protective sheath 216, for example, of plastics material such as that known under the name "Delrin," which can slide over said brush and which is integral with a sleeve 217, in this example moulded as a single piece with the protective sheath 216. The sleeve 217 can slide inside the cap 207 and its end opposite the protective sheath 216 has an integral rib 218 which can engage selectively in one or the other of two grooves 221, 222 (see for example FIGS. 15 and 18) in a manner so as to lock the protective sheath 216 either in its projecting position as shown in FIG. 18, or in its withdrawn position as shown in FIG. 17. This locking is resilient thanks to the resilient properties of the operative components, particularly of the polypropylene brushholder.

When the protective sheath 216 is in its withdrawn position (FIG. 15 for example) the hairs 204 of the brush are outside said sheath, whilst when the protective sheath is projecting, as shown in FIG. 18, the hairs 204 of the brush are imprisoned inside the sheath 216 and protected by it.

The part of the handle 205 of the brush adjacent to the hairs 204 presents an annular sealing gland 225 in contact with the interior of the protective sheath 216. In this example, this sealing gland is moulded unitarily with the polypropylene handle 205 of the brush.

On the upper part of the container 201 is fixed, by means of a bush 226, a part 227 which will be referred to in what follows as the neck of the container. The bush 226 is made of a relatively flexible plastics material for example in "Buna Neoprene," with the shore hardness of 60, while the neck 227 is made of a super-polyamide, for example of "Nylon." The neck 227 is also covered by an extension of the casing 211 of which the outer diameter is substantially equal to the inner diameter of the cap 207 so that the latter can be easily frictionally mounted on said neck casing.

On the end of the neck 227 an annular gland 231, for example of "Neoprene" of shore hardness 70, is gripped by the inturned end of the extension of the casing 211; its internal diameter is slightly less than the external diameter of the protective sheath 216 so as to grip the latter when one withdraws the brush from the container.

The component 227, which forms the neck of the container presents an internal extension 232 which will be called in what follows the shaping gripper and which ends in a reverse frusto-conical part 233 the summit of which presents a small opening, for example of circular form as indicated at 234 in FIGS. 17 and 20. The gripper 232 and its frusto-conical end 233 present radial slits 235 which are four in number in this example and which define four segments forming between them a radially extensible gripper which can open when one replaces the brush in the container. The gripping force of the gripper 232 is reinforced by the gripping bush 226 of an elastomer which exerts a radial centripetal force on said gripper. The inner end of the bush 226 is also of frusto-conical form, pierced at its centre, and is applied to the pointed part of the gripper 232.

The operation of the device is as follows:

When the device is closed, its different components occupy the positions shown in FIG. 15 where one sees that the cap 207 is pushed completely onto the neck 227 of the container so that the sleeve 217 bears on the top of said neck through the intermediary of the gland 231, this sleeve being forced into its position inside the cap such that the protective sheath 216, which is unitary with it, leaves uncovered the hairs 204 of the brush which thus freely soak in the liquid 202. The liquid-tightness of the whole is ensured by several means, firstly by the gland 225 which ensures a sealing between the handle 205 of the brush and the protective sheath 216, then by the lips of the shaping gripper 232 which are urged against the protective sheath 216 under the effect of their own elasticity to which is added the elasticity of the gripping bush 226, and lastly by the gland 231 which is gripped between the end of the neck 227 and the container of the adjacent face of the sleeve 217 and which, further, is urged radially against the protective sheath 216. No trace of liquid can then escape to the outside of the container whatever position it takes up.

For use it is only necessary to withdraw the brush by taking hold of the container 201 in one hand and the cap 207 in the other; the locking of the sleeve 217 in the annular groove 222 of the brush holder 206 exerts a force capable of overcoming the friction, which is very weak it must be added, of the protective sheath 216 against the lips of the shaping gripper 232 and against the gland 231; in the course of this movement the gland 231 wipes off the small quantity of liquid which could otherwise soil the protective sheath 216 by leaking between the latter and the lips of the shaping gripper 232. Further, at the moment when the hairs 204 of the brush arrive at the height of the end of the shaping gripper 232, the latter compresses said hairs and expresses the excess liquid, in such a manner that there remains in the brush just the right quantity of liquid for application without the risk of smudges or the drops of liquid falling. In the example the ends of the lips 233 of the gripper 232 leave between them a circular hole which shapes in this manner all the hairs of the brush to a well rounded and tapered shape which facilitates application. FIG. 17 shows the brush completely withdrawn in position for use.

Before replacing the brush in the container one brings back the end of the protective sheath 216 over the hairs 204 of the brush as shown in FIG. 18 by holding the cap 207 in one hand and exerting with the other hand on the sheath 216 in the direction of the arrow f2 a tractive force sufficient to overcome the resilient locking of the rib 218 in the groove 222.

Still holding the brush holder in one hand by the cap 207 one pushes the brush 203 entirely covered by the protective sheath 216 into the neck 227 of the container which one holds in the other hand. The end of the protective sheath 216, slightly tapered, enlarges the hole in the sealing gland 231 at the beginning of this movement, then when it reaches the end of the shaping gripper 232 it parts the lips 233. At a certain moment the assembly thus occupies the position shown in FIG. 19 in which one end of the sleeve 217 bears against the outer face of the gland 231 fixed on the top of the neck of the container and in which the protective sheath 216 then occupies its position of maximum insertion into the container. Up to that time the force of the resilient locking system of the sleeve 217 on the brush holder 206 is sufficient for the force which one exerts on the holder to be transmitted directly to the protective sheath 216 and permits it to overcome the friction of the latter in the gland 231 and above all against the lips 233 of the shaping gripper to open the latter in opposition to its own resilient force and that of the gripping brush 226 which surrounds it. One then continues to exert a force on the cap 207 until one ovecomes the resilient locking force of the system so that the brush-holder is disconnected from the rib 218 of the sleeve 217 and is forced into the latter carrying with it the brush 203 of which the hairs 204 leave the end of the protective sheath 216 which dips into the liquid. The outward movement of the brush is limited by the entry of the reslient rib 218 on the sleeve 217 into the groove 222 in the brush-holder 206. All the components have now returned to the respective positions shown in FIG. 15 and the device is then completely closed again.

For ease of manipulation it is preferable that after the position of use shown in FIG. 17 one should push out the protective sheath 216 to protect the hairs 204 of the brush as shown in FIG. 18, by means of a very small force. To this end the resilient locking system of the brush-holder 206 in the rib 218 of the sleeve 217 is shaped in a manner such that the resilient engaging force of these two components should be very small when the rib 218 is in the groove 222 as shown in FIG. 17, but when it is in the groove 221 as shown in FIG. 18 then in this latter position the resilient locking should be sufficiently strong to overcome the resistance to opening of the shaping gripper 232. This can be effected with different profiles of the grooves 221 and 222.

When one withdraws the brush from the container the central opening 234 of the shaping gripper gives to the brush the shape corresponding to this opening. In the example shown in FIG. 15 to 20, this opening is of circular shape whilst in the variants of FIG. 21 and 22 this shape is rectangular as indicated at 236 or triangular as indicated at 237, respectively, according to need.

Figure 23:
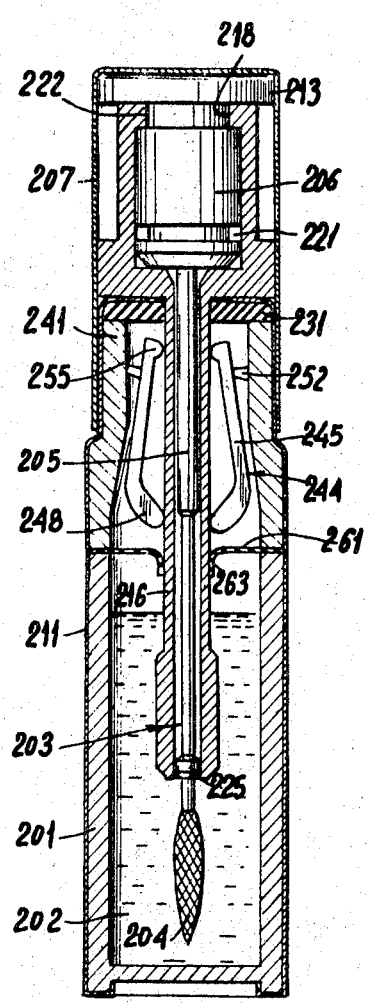
FIG. 23 is a longitudinal section through a second embodiment shown closed.

In one variant one can dispense with the gripping bush 226 for the shaping gripper and design this latter so that its own resilience is sufficient to ensure on its own the appropriate gripping of the brush when it leaves it, such as shown in FIG. 23.

In another embodiment shown in FIG. 23 to 31 the device still essentially comprises a container 201 (FIG. 23) containing the liquid to be applied 202, and a brush 203 of which the hairs are indicated at 204 while the handle 205 is fixed in a brush-holder 206 mounted in a cap or closure 207 by means of which the user holds the brush.

This other embodiment also comprises other points in common with that of FIG. 15 and the same reference numerals are retained to designate the corresponding elements.

There will only then be described the characteristic features of this other embodiment which differ from the embodiment of FIG. 15.

Figure 24:
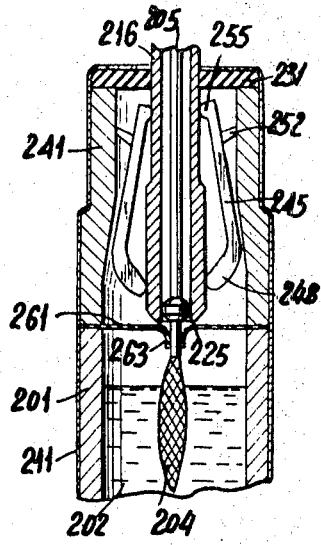

Between the neck 241 and the upper part of the body of the container 201 is trapped and welded the marginal part of a flexible and resilient membrane 261 (see also FIG. 30) the central zone of which has incisions 262 of general star-like shape, of a radial length sufficient for the triangular tongues 263 thus formed between said incisions to be able to curve inwards and move aside for the passage of the protective sheath of the brush, as shown in FIGS. 23 and 24 for example. This membrane is for example of "Neoprene."

Inside the neck 241, and coaxial with it, there is a deformable tubular element designated in this version by the numeral 244 and formed of several (four in this example) segments 245 completely separated one from another by radial intervals 246 (FIGS. 26 and 31). At their end facing towards the bottom of the container, these segments terminate in a lip 248 together forming a shaping gripper of general conical shape of which the summit, directed towards the bottom of the container, is pierced in whatever shape it is desired to give the brush when one withdraws it from the container, that is to say a circular shape in the example illustrated, as shown at 249.

Each of the segments 245 is connected, at an intermediate zone of its length, to the wall of the neck 241 of the container, by flexible hinge elements 252, two in number in the embodiment illustrated. Preferably the segments 245 and their hinge elements 252 are moulded unitarily with the neck 241, for example in a superpolyamide such as "Nylon."

The end of each segment 245 opposite to that which presents the shaping lip 248 is provided with an internal rib 255 and the whole of the annular rib formed from the four segments presents an internal diameter such that when only the end of the protective sheath 216 of the brush engages said rib, as shown for example in FIG. 27, the shaping lips 248 are urged one against another.

Each of the segments 245 constitutes a sort of lever articulated by these hinge elements 252 in the neck 241 of the container and capable of pivoting, while also being deformed resiliently in a manner so as to be able to take up either the position shown in FIG. 27 for example in which the shaping lips 248 are gripped together, or the position shown for example in FIG. 28 where said lips are on the contrary separated one from another.

Figure 25:
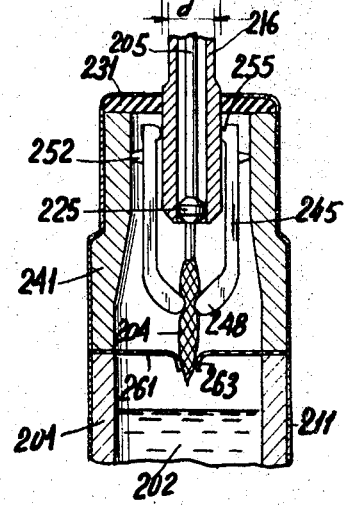

The end of the protective sheath 216 has, over a length less than the length of the segment 245, a diameter "D" (FIG. 26) which ensures powerful gripping of the brush as one can see further by reference to FIG. 25; but the remainder of said sheath has a smaller diameter "d" so as not to wear out the assembly of shaping and wiping elements, and in particular the segments 245 with the lips 248, and the gland 231.

The operation of the device is as follows:

When the holder is closed its different elements occupy the positions shown in FIG. 23. For use it is only necessary to withdraw the brush by holding the container 201 in one hand and the cap 207 in the other; the locking of the sleeve 217 in the annular groove 222 (FIG. 23) of the brush-holder exerts a force capable of overcoming the friction, which is very slight, of the protective sheath 216 against the flexible membrane 261, the lips 248 of the shaping gripper, and the gland 231; in the course of this movement the gland 231 wipes off the small quantity of liquid which might otherwise soil the protective sheath 216 by leaking between the latter and the lips of the shaping gripper. When the end of the protective sheath 216 has freed itself from the internal membrane 261 (FIG. 24), the triangular tongues 263 (FIG. 30) of the latter immediately grip against the handle of the brush 203 and serve to wipe off the major part of the excess liquid in the hairs 204 of the brush, so as to avoid soiling the shaping lips 248. Then, the end of the diameter "D" of the protective sheath 216 reaches the rib 255 of the segments 244 (FIG. 25) and separates the upper ends of the latter by making them pivot about their hinges 252 so that the shaping lips 248 are forced strongly against the hairs 204 of the brush which shapes them and in which they leave no more than the quantity of liquid strictly necessary for use.

Thus the user now has in his hand the closure which carries the brush of which the hairs are revealed; the application of the liquid takes place without risk of smudging or of shedding drops of liquid. In the example the ends of the shaping lips 248 leave, between them, a circular hole 249 which thus moulds the assembly of hairs of the brush into a well rounded and tapered shape which facilitates application. The liquid-tightness of the container, now relieved of its closure, is ensured by the membrane 261 of which the triangular tongues 263 touch one another edge to edge.

After use and before replacing the brush into the container one pushes out the end of the protective sheath 216 over the hairs 204 of the brush, as shown in FIG. 26, by taking the cap 207 in one hand and exerting with the other hand on the sheath 216 in the direction of the arrow f2 a tractive force sufficient to overcome the resilient locking of the rib 218 in the groove 222 (FIG. 23).

Still holding the brush-holder in one hand by the cap 207 one pushes the brush 203 entirely covered again by the protective sheath 216 through the gland 231 into the neck 241 of the container which one holds in the other hand.

The end of the protective sheath 216, slightly tapered, opens up the hole in the sealing gland 231 at the beginning of this movement, then it penetrates the shaping gripper 244 (FIG. 27) and when it reaches the shaping lips 248, it separates them as shown in FIG. 28. One continues to push the closure and the end of the protective sheath 216 separates the leaves 263 of the membrane 261 (FIG. 28). At a certain time the assembly occupies a position in which the end of the sleeve 217 bears against the outer face of the gland 231 fixed on top of the neck of of the container and in which the protective sheath 216 occupies its position of maximum insertion into the container. Up to that time the force of the resilient locking system of the sleeve 217 on the brush-holder 206 was sufficient for the force which one exerts on this latter to be transmitted directly to the protective sheath 216 and to permit it to overcome the friction of the latter in the gland 231 and above all against the lips 248 of the shaping gripper to open the latter against its resilient force. One then continues to exert a pressure on the cap 207 so as to overcome the force of the resilient locking system, the brush-holder then disengages from the rib 218 of the sleeve 217 and is forced into the latter carrying with it the brush 203 of which the hairs 204 project from the end of the protective sheath 216 which dips into the liquid. The outward movement of the brush is limited by the entry of the resilient rib 218 of the sleeve 217 into the groove 222 of the brush-holder 206. All the elements have now returned to the respective positions shown in FIG. 23, and the device is then completely closed again.

Of course the invention is not limited to the embodiments described and illustrated, one could incorporate modifications to it without departing from the scope of the invention.

It is thus, for example, that one could give the body of the reservoir and the closure any desired shape other than a cylindrical shape.

I claim:

1. An applicator for use in applying a viscous liquid, such as a cosmetic paint, said applicator comprising a liquid container having a neck portion defining an opening in one end thereof, a removable closure cap for the container and engageable with the neck portion of said container, a brush mounted on said closure cap, said brush comprising an elongate stem and bristle means at one end of said stem, a protective tube, said tube being mounted on said closure cap and surrounding said stem, a sealing gland in said container, said sealing gland surrounding said tube, said tube projecting from said closure cap to below said sealing gland, the portion of said tube extending below said sealing gland being sealed from the portion above and being adapted to be wiped by said sealing gland when said tube is withdrawn from said container, and control means on said closure cap operative to provide relative sliding movement to be effected between said stem and said tube so that in one relative position, when the brush is to be replaced in the container, the tube covers the bristle means of the brush, and in another relative position, when the brush is ready for use, the bristle means of the brush project outwardly from the tube.

2. An applicator according to claim 1 characterized in that said sealing gland is a resilient annular gland of which the internal diameter is a little less than the external diameter of said protective tube.

3. An applicator according to claim 1 characterized in that the stem of the brush is resiliently urged toward a position in which said bristle means are covered by the protective tube.

4. A device according to claim 1 characterized in that the closure has an extension of a shape similar to the shape of that part of the closure cap which is engageable with the neck portion of the container, said extension also being engageable with the neck portion of the container for closing the container with the brush being outside of the container, and said extension including means cooperating with said neck portion for pushing the stem of the brush to a position in which the bristle means project from the protective tube.

5. A device according to claim 1 characterized in that sealing means is interposed between the protective tube and the stem in the neighbourhood of that end of the latter which carries the bristle means.

6. An applicator according to claim 1 characterized in that the container and the closure cap are cylindrical and are of the same external diameter.

7. An applicator according to claim 1 in which the closure cap is tubular and comprises a tubular member and a rotatable sleeve, an elongate opening within said closure cap, a body axially slidable in said opening and carrying said protective tube, said body having at least one lug which engages a groove in the rotatable sleeve, and a groove in the tubular member, one of said grooves being helical and the other being parallel with the longitudinal axis of the closure cap, and said rotatable sleeve being accessible from outside so that by relative rotation between said sleeve and said tubular member the protective tube can be caused to slide relatively to the stem of the brush, so that the bristle means at one time can be covered by the tube and at another time can project from the tube.

8. An applicator according to claim 7 characterized in that the slidable body is mounted inside the rotatable sleeve, which is in turn mounted inside the tubular member, and that said sleeve has an axial extension above said tubular member to which the stem of the brush is fixed.

9. An applicator according to claim 7 characterized in that the container has a threaded part on which both ends of the closure cap can be screwed, the rotatable sleeve being outside the tubular member and completely surrounding it, and the sense of the helical groove being such relative to the sense of the threads on the container and the closure cap, that the sense in which the rotatable sleeve must be rotated to cause the bristle means of the brush to retract into the protective tube is the same as the sense in which the closure cap must be rotated to screw it onto the neck of the container.

10. An applicator according to claim 1 characterized in that the central part of the sealing gland which grips the tube comprises a disc with a diametral slit.

11. An applicator according to claim 1 characterized in that the sealing gland which grips the protective tube comprises a transverse partition with a central part of conical shape the point of which is directed towards the interior of the container and the side surface of which has incisions which extend the whole length of said surface in such a manner as to form triangular resilient tongues which tend to press towards one another to wipe the tube during its withdrawal from the container.

12. An applicator according to claim 1 characterized in that the stem of the brush is rigidly fixed adjacent the base of the closure cap, while the adjacent end of the protective tube is fast with a member which is slidable axially in the closure cap between two abutments thereon.

13. A device according to claim 12 further characterized by means for resiliently locking the said member in each of the two end positions of said member in the closure cap.

14. A device according to claim 13 characterized in that the neck portion of the container penetrates into the closure cap a depth substantially equal to the axial travel of the protective tube and which abuts the member fast with said tube and pushes it back when the closure cap is reconnected to the container.

15. An applicator for applying viscous liquids such as paints and the like comprising, in combination, a container having a neck portion defining an opening and being adapted to contain said liquid below said neck portion, a removable cap member supported on said neck portion, and a brush stem having bristles at one end for insertion through said opening into said container, a tubular member enclosing a longitudinal portion of said stem and extending through said opening into said container, annular resilient means mounted in said container and above the bottom thereof and above a zone adapted to contain said liquid, said resilient means forming a liquid tight seal with said tubular member during lengthwise movement thereof relative to said container, and means on said cap member for separately attaching each of said tubular member and said stem to said cap member while permitting relative limited axial movement of said tubular member and said stem between a position in which said bristles extend from the tubular member and a position in which said bristles are retracted in said tubular member.

16. In the applicator of claim 15 in which annular sealing means are mounted between said stem and said tubular member to prevent liquid from passing from said container beyond said sealing means. ample.

17. A holder for liquid paint comprising a brush mounted on a removable closure for a contained charged with paint or other viscous liquid, the brush having a handle, said handle being covered with a protective sheath which is slidable relatively to said handle to cover the bristles of the brush at least when the latter is being inserted into the container and to uncover the bristles at least when the brush is to be used, the neck of said container carrying a resilient sealing gland gripping said sheath, characterized in that the neck of the container is provided internally with a tubular deformable element forming a shaping gripper which comprises several segments separated one from another by radial discontinuities and terminating in shaping lips resiliently urged against one another, the ends of said lips forming between them a wall of generally conical shape of which the summit, directed towards the bottom of the container, is pierced to whatever shape it is desired to give the brush when it is withdrawn from the container.

18. A holder according to claim 17 in which the shaping gripper is of a resilient material capable on its own of gripping the shaping lips one against another.

19. A holder according to claim 17 in which the shaping gripper is of a thermoplastic material formed unitarily with the neck of the container.

20. A holder according to claim 17 in which the shaping gripper is gripped within a resilient bushing.

21. A holder according to claim 20 in which the gripping bushing for the shaping gripper has a flange by means of which the neck is attached to the container.

22. A holder according to claim 11 in which the hardness of the material from which the shaping gripper is made is sufficient for the lips of said gripper to retain substantially, when they are pushed radially in an outward direction by the protective sheath which one introduces into the container, the individual shapes which they have in the free state, closed one against another.

23. A holder according to claim 17 in which the end of the handle of the brush is rigidly fixed in the bottom of the closure whilst the corresponding end of the protective sheath is fixed with a sleeve which can slide axially in the closure between two stops on the latter and is provided with resilient locking means in each of its two end positions in the closure, the resilient axial locking system of the sleeve in the closure exerting on said sleeve when this is to be forced into the closure, a force greater than the force with which the lips of the shaping gripper resist the entry of the protective sheath during its replacement into the container.

24. A holder according to claim 23 in which the resilient axial locking system of the sleeve in the closure exerts, in a direction which enables the protective sheath to cover the bristles of the brush, a resistance less than in the opposite direction.

25. A holder according to claim 23 in which the deformable tubular element forming the shaping gripper is disposed coaxially in the interior of the neck of the container to which its segments, completely separate one from another, are connected in a zone intermediate their length, by flexible hinge elements, the end of each segment opposite to that which has the shaping lip being provided with an internal rib of which the diameter is such that when only the end of the protective sheath of the brush engages said rib the shaping lips are urged one against another.

26. A holder according to claim 25, in which the end of the protective sheath has, over a length less than the length of the segment of the shaping gripper, a certain diameter whilst over the rest of its length it has a lesser diameter.

27. A holder according to claim 25 in which the container is closed in the neighbourhood of the shaping-gripper by a flexible and resilient membrane of which the central zone has incisions of general star-like shape of a radial length sufficient to enable the triangular tongues formed between said incisions to be curved inwards and moved aside on the passage of the protective sheath and of the brush.

References Cited

UNITED STATES PATENTS

| | | | |
|---|---|---|---|
| 2,238,953 | 4/1941 | Steinmetz | 401—127 |
| 2,517,663 | 8/1950 | Hendry | 401—127 |
| 2,703,898 | 3/1955 | Kellett | 401—122 |
| 2,867,829 | 1/1959 | Aversa | 401—191 |
| 3,084,374 | 4/1963 | Ziegler | 401—122 |
| 3,246,657 | 4/1966 | Roller | 401—128 |
| 3,415,604 | 12/1968 | Ahrens | 401—122 |

LAWRENCE CHARLES, Primary Examiner

PO-1050
(5/69)

UNITED STATES PATENT OFFICE
CERTIFICATE OF CORRECTION

Patent No. 3,529,899     Dated September 22, 1970

Inventor(s) Ralph Gruska

It is certified that error appears in the above-identified patent and that said Letters Patent are hereby corrected as shown below:

Column 1, line 64 - "causses" should be -- causes --.

Column 3, line 22 - " a" should be -- of -- (first occurrence).

Column 5, line 62 - "glond" should be -- gland --.

Column 7, line 23 - following "ruffling the" insert -- hairs. When at the end of this penetration --

Column 9, line 44 - "brush" should be -- bush --.

Column 13, line 75 - "contained" should be -- container --.

Column 14, line 29 - numeral "11" should be numeral --17--.

SIGNED AND
SEALED
DEC 1 1970

(SEAL)
Attest:

Edward M. Fletcher, Jr.
Attesting Officer

WILLIAM E. SCHUYLER, JR.
Commissioner of Patents